Patented July 25, 1950

2,516,633

UNITED STATES PATENT OFFICE 2,516,633

PREPARATION OF STARCH ETHERS IN ORIGINAL GRANULE FORM

Carl C. Kesler and Erling T. Hjermstad, Cedar Rapids, Iowa, assignors to Penick & Ford, Ltd., Incorporated, Cedar Rapids, Iowa, a corporation of Delaware No Drawing. Application April 10, 1947, Serial No. 740,718

11 Claims. (Cl. 260—233.3)

This invention relates to an improved starch product in its original granule form and its method of manufacture. The invention relates broadly to an improved method of manufacturing partially etherified carbohydrates, and is more particularly concerned with the partial etherification of starch in its original granule form and the improved product resulting from such etherification.

The present application constitutes a continuation in part of our co-pending application Serial No. 688,976, for Starch Ethers in Original Granule Form. It represents an improvement in that the etherified, granule starch product may be easily manufactured in processing equipment commonly used in the starch industry.

Etherifying agents, such as alkylene oxides or organic halohydrins, have been used heretofore in connection with cellulose and other carbohydrates, including starch. The amounts of the etherifying agents used have been relatively large and the degree of reaction brought about marked changes in the chemical and physical properties, as evidenced by cold water swelling or formation of plastic masses.

The etherification of starch and other carbohydrates with alkylene oxides or halohydrins is usually accomplished in strongly alkaline media or by the action of these reagents on alkali carbohydrates containing at least 5% by weight of alkali, calculated as NaOH, and more often 20% by weight or more. Heretofore, useful starch-hydroxy alkyl derivatives have been produced by using sufficient alkali to swell or disperse the starch before the reaction or by treating starch in the absence of alkali with an excess of etherifying agent thereby producing products which have little resemblance to the original starch, either in appearance or physical properties.

It has long been the goal of starch research to make from corn starches products of commerce that would possess the properties or utility of the root starches or more recently the waxy starches. Corn starch from the usual field varieties form in many industrial concentrations rigid gels when cooled. It does not have the cohesiveness or tack necessary for many uses. To meet this need much time has been spent by the plant chemists and other scientists to develop the waxy varieties. Corn from China was found to contain starch with little tendency to gel or retrograde. Hybrids with the waxy characteristics are now grown and are available. These waxy varieties must be kept isolated from ordinary corn both in the growing and subsequent handling. Its production requires a substantial premium due to this separate handling and to lower yields of the more valuable constituents.

We have discovered a method of treating non-glutinous cereal starch in its original granule form to impart to it the properties possessed by the root starches or the waxy varieties. Our discovery allows for the production of products which have the recognized desirable attributes of the root starches such as improved cohesiveness, little tendency to gel or retrograde, ease of enzyme modification and a lower gelatinization temperature.

We are aware that several patents have been issued covering the use of ethylene oxide as a fumigant for dry, colloidal materials, including starches and materials derived from starches. However, the process described in these patents are carried out under conditions favoring the effective sterilization of the material without causing noticeable changes in its physical properties.

We are also aware of several patents relating to the reaction of alkylene oxides or halohydrins with starch or cellulose or their alkali derivatives. German Patents No. 368,413 and No. 363,192 describe the treatment of dry starch or cellulose with amounts of ethylene oxide from 10% up to 3000% by weight of starch with the production of materials which swell in water without heating or are so drastically treated that they are plastic swollen masses.

Schorger, in U. S. Patents No. 1,863,208, No. 1,941,276, No. 1,941,277, and No. 1,941,278, reacts alkylene oxides with the alkali derivative of carbohydrates, particularly cellulose. He found it necessary to use sufficient alkali to swell the starch or form its alkali derivative and did not react starch in its original granule form or obtain a product with the original granule form.

Hagedorn, Ziese, and Reyle in U. S. Patent No. 1,876,920, cause a caustic alkali and alkylene oxides to act simultaneously on carbohydrates, the amount of caustic alkali being in the neighborhood of 20% of the weight of starch. Dreyfus, in U. S. Patents No. 2,055,892, No. 2,055,893, and No. 2,094,100, reacts alkylene oxide with cellulose containing or in the presence of not more than 10% by weight of alkali. In summary, the object of the mass of the prior art has been to produce from carbohydrates, primarily cellulose, by means of alkylene oxides, materials easily swollen in water with heat and more often reacted with large amounts of alkali or ethylene oxide or both to give a plastic mass capable of being dispersed in various solvents.

An object of this invention is to produce from cereal starches such as corn, wheat, and rice starches, products having properties which are characteristics of root starches and waxy starches by partially etherifying said starches with very small proportions of hydroxyalkylating agents without altering the apparent granule structure of the starches, or destroying the properties which make ordinary or granule starch useful.

A specific object is to react ungelatinized, unswollen, commercial cereal starches with small amounts of hydroxyalkylating agents to produce a product which will form a cohesive, glutinous, or "stringy" paste on being cooked thoroughly in water at temperatures above the normal gelatinization range of the starches.

Another object is to react ungelatinized, unswollen cereal starches with small amounts of hydroxyalkylating agents to produce products with greatly reduced retrograding tendencies and greatly reduced setback or gelling of the cooked pastes.

Another object is to react unswollen, ungelatinized cereal starches with small amounts of hydroxyalkylating agents to produce starches whose pastes will dry to film with an increased clarity and flexibility as compared to the original starch. Other specific objects and advantages will appear as the specification proceeds.

The broad invention relates to an improvement in the manufacture of starch hydroxy-alkyl ether derivatives which retain the original granule form of the starch with new and improved properties. Broadly, the process consists in agitating a suspension of cereal starch in water at temperatures well below the normal gelatinization range of the starch with a hydroxyalkylating agent and sufficient alkali to bring about a partial etherification of the starch without apparent alteration of the granule structure. The amount of hydroxyalkylating agent combined with the starch much necessarily be low enough to yield a product which does not swell or gelatinize during the reaction at the temperature used.

Any non-glutinous starch may be employed. Included therefore are unmodified starches, acid-modified thin-boiling starches, and all of the common commercial cereal starches. We find that all of such starches, whether unmodified or partially modified respond to the present process and bring about the desired results.

The alkali used may be alkaline earth hydroxides, salts which liberate alkali upon reaction with water, or salts which react with the hydroxyalkylating agent in the presence of water to produce alkali. For example, sodium chloride will react readily with alkylene oxides in the presence of water to liberate free hydroxyl ions and the presence of starch increases the amount of alkali liberated. The use of sodium chloride or similar salts in this way represents a novel, convenient, and economical method of introducing sufficient alkali into the starch suspension to promote the reaction between the starch and the alkylene oxide, without gelatinizing the starch.

Commercial starches, after being separated from other constituents of the cereal grain, are transported during processing in a water slurry which usually contains around 40 to 45% by weight of starch. It is convenient to carry on certain modification processes in this slurry before the starch is dewatered and dried. The addition of strong alkali alone to this slurry is difficult as the alkali tends to gelatinize the starch at the point at which it is added before it is diluted and distributed throughout the slurry.

If the alkali is first diluted to a concentration sufficiently low to prevent gelatinization when added to a high concentration starch slurry the greater dilution of the slurry results in delay in dewatering or filtration. Sodium chloride, however, will dissolve in the slurry readily without gelatinizing the starch or lowering the solids concentrations and will react with alkylene oxides to produce alkali after it has been dissolved and distributed. Alkali may also be added in the form of a mixture of sodium hydroxide and sodium chloride solutions. For example, a water solution containing 10% sodium hydroxide and 25% sodium chloride can be stirred into a 43% starch slurry at 125° F. without gelatinizing the starch, provided the total amount of alkali added is not great enough to gelatinize the starch after it is dissolved and distributed.

Alkali may be added in the form of salts of weak acids, as for example sodium carbonate or disodium and trisodium phosphates. Strong alkali, such as sodium or potassium hydroxide may be used alone or in combination with salts.

Whenever reference is made to a hydroxyalkylating agent it is intended to cover those compounds which contain either the ethylene oxide structure, as illustrated by the skeleton formula

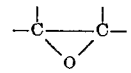

or the halohydrins corresponding to these oxides which contain the ethylene halohydrin structure as illustrated by the skeleton formula

where X represents a halogen atom. Some examples of hydroxyalkylating agents which will react with starch under the conditions herein specified are ethylene oxide, which has the structural formula

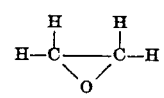

1,2 epoxy-propane, which has the structural formula

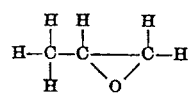

and ethylene chlorohydrin which has the structural formula

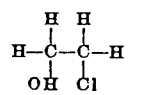

The process described is very readily adapted to the type of equipment commonly used in the starch industry and does not require any processing operations in addition to those now carried on in manufacturing various starch modifications. The starch slurry which contains 40 to 45% by weight of starch may be reacted in covered wooden tanks equipped with agitators. The type of tank commonly used for converting unmodified starch to thin-boiling starch may be used. Soluble alkali or salt or both salt and alkali are mixed into the starch slurry. We prefer to use from 0.5% to 5% by weight of NaCl based on the water in the slurry and from 0.2% to 0.5% by weight of NaOH based on the starch in the slurry. Calculating the above upon a molecular proportion basis, the proportions of alkali and starch are .008 to .02 mole of alkali per $C_6H_{10}O_5$ mole of starch. Other porportions may be used, however, provided the hydroxyl ion concentration reached during the reaction is not high enough to gelatinize the starch under the operating conditions in use. We prefer to carry on the reaction at a temperature of from 120° to 130° F. though somewhat higher or lower temperatures may be used, depending on the degree of alkalinity of the reaction mixture and the time allowed for the reaction.

The hydroxyalkylating agent, preferably ethylene oxide, is introduced into the starch slurry after the salt and alkali are dissolved and distributed. Ethylene oxide may be introduced by conducting the liquid or gaseous phase through a pipe to the bottom of the tank at a rate slow enough to prevent undissolved bubbles from reaching the surface and escaping to the atmosphere. The slurry is then agitated until substantially all of the hydroxyalkylating agent has been reacted, the time of reaction varying according to the kind or amount of hydroxyalkylating agent used, the temperature of the reaction, and the degree of akalinity reached during the reaction. If the hydroxyalkylating agent used is ethylene oxide in the amount of 3% based on the starch, we prefer to carry on the reaction for a period of 8 to 24 hours, though shorter periods of time have been sufficient to produce the desired results when higher temperatures or alkalinity have been used.

After the reaction the starch may be dewatered, washed, and dried by the methods ordinarily used in the starch industry or the slurry may be used with or without washing and neutralizing in various industrial applications. The slurry may be neutralized with acidic materials to a pH of between 5 and 7, or the starch dewatered, washed and dried without neutralization, thus leaving the product slightly alkaline.

The degree or extent of etherification may be varied in accordance with the desired characteristics of finished product. We prefer to react the starch with less than 5% by weight of ethylene oxide. We have found that amounts of ethylene oxide as low as 1% by weight will greatly reduce gelling and retrograding tendency of unmodified corn starch.

It is well known that unmodified corn starch pastes above 3.5% solids concentration after cooking set up and form an opaque gel or tend to lose the ability to flow freely, especially on cooling. At the same time the phenomenon termed "retrogradation" takes place; this involves the formation in the paste of insoluble, crystalline material which will not readily redisperse on reheating with water. An unmodified cornstarch reacted with as little as 2% by weight of ethylene oxide will form a paste when cooked thoroughly that resembles the paste of waxy maize or other glutinous starches. Its paste properties parallel those of waxy maize in that it gives a red-violet color with iodine solution, has a very greatly reduced gelling tendency, increased clarity or paste and dried films, and a greatly reduced tendency to retrograde. By reacting from 1 to 5% by weight of ethylene oxide with unmodified cornstarch and then cooking this product as in ordinary commercial practice, a paste is obtained which is translucent, does not gel on cooling, and has a very glutinous, cohesive, or "long" character. Pastes of unmodified cornstarch reacted in the manner described in this specification with 3% by weight of ethylene oxide are exceptionally clear and cohesive and do not retrograde on continued standing, even at refrigeration temperatures.

Other hydroxyalkylating agents such as 1,2 epoxy propane, and ethylene chlorohydrin were found to give similar characteristics to cornstarch when molecular equivalent amounts were used. They react with starch at a lower rate, however.

The properties of the starches treated with small amounts of ethylene oxide suggests numerous industrial applications for this product. One of the serious disadvantages of cereal starches for many uses is the tendency of their pastes to set back or retrograde. The glutinous starches, such as tapioca which do not have this characteristic to such a marked degree have long been considered the best bases for the preparation of adhesives. Also, the tacky or "long" character of the pastes formed from glutinous starches has been considered a valuable property in adhesives. For many purposes, such as in veneer glues, the adhesive must possess ability to flow at relatively high concentrations. Ordinary cereal starches and many of their modifications tend to set up or gel in high concentrations, or lack the necessary flow properties. The treatment of cereal starches with ethylene oxide would improve them considerably in this respect.

In the sizing and coating of paper a starch which has a reduced gelling and retrograding tendency is usually desired. Such starches allow for greater mobility and lower yield values and higher dry substance at a viscosity suitable for commercial application.

Starches which do not retrograde or gel are very useful in the textile industry. In finishing fabrics a starch which forms a clear, transparent, film is desired. Those that retrograde are not suitable because their films are rather opaque. Textile printing pastes require starches or gums with high paste viscosity at low paste concentrations. The ethylene oxide treated starches are suitable since they may be made with extremely high paste viscosities, their pastes are easily diluted, and they have negligible gelling and retrogradation on standing. For cord polishing a starch which is slow-congealing and has a "long," stringy paste is suitable. Ordinary cornstarches are not suitable because of their paste "shortness" and their gelling properties. Treatment of cornstarch with ethylene oxide gives it characteristics making it suitable for this use. Numerous other uses for a starch having the improved properties described in this patent specification should be obvious to those skilled in the art.

Specific examples of the process may be set out as follows:

*Example 1*

Seventy-five lbs. of a 43.5% by weight unmodified cornstarch-water slurry is placed in a covered vessel provided with agitation and temperature control. The starch slurry is brought to a temperature of 125° F. and a mixture containing 90 grams of a 50% by weight sodium hydroxide solution and 731 grams of a 26% by weight sodium chloride solution is added slowly to the slurry while agitated. Four hundred and ninety grams of ethylene oxide is dissolved in the slurry by conducting the gaseous phase to the bottom of the vessel through a pipe at the rate of 8 grams per minute. The mix is then agitated for 20 hours within a temperature range of 120–130° F. The slurry is then neutralized to a pH of 6.0 and the starch product filtered, washed substantially free of salt and dried. The product on being cooked in a neutral 5% solids concentration water suspension with heat to granule dispersion will form a relatively clear, cohesive paste which will not form a rigid gel or retrograde on cooling and will retain its fluidity and clarity on standing.

*Example 2*

Eighty lbs. of a 43.7% by weight unmodified cornstarch-water slurry is placed in a covered vessel provided with means of agitation and temperature control. Two and one-quarter lbs. of dry sodium chloride is dissolved in the slurry. The starch slurry is brought to a temperature of 125° F. and 476.4 g. of ethylene oxide dissolved in the slurry by conducting the gaseous phase to the bottom of the agitated slurry through a pipe at the rate of 3.6 grams per minute. After agitating the mix within a temperature range of 120°–130° F. for 20 hours the slurry is neutralized to a pH of 6.5 and the starch product filtered, washed substantially free of salt, and dried. The product on being cooked in a neutral 5% solids concentration suspension with heat to granule dispersion will form a translucent, cohesive paste which will not gel on cooling and will retain its translucency and cohesive character on standing.

*Example 3*

Sixty-five pounds of a 43% by weight slurry of an acid-modified thin-boiling cornstarch is placed in a tightly covered vessel provided with means of agitation and temperature control. This starch has a maximum viscosity of 148 gram-centimeters when measured in a Corn Industries Viscometer in an 8% dry basis concentration with a bath temperature of 92° C. The procedure for this test is described in the Journal of Industrial and Engineering Chemistry, Analytical Edition, vol. 19, pp. 16–21, 1947.

Five per cent by weight of dry sodium chloride based on the water is dissolved in the slurry. Fifty grams of sodium hydroxide dissolved in 1400 cc. of filtrate previously removed from the slurry by means of a suction filter leaf is slowly added to the slurry with agitation. The slurry is then brought to a temperature of 125° F. and 381.4 grams of ethylene oxide is dissolved in the slurry by conducting the gaseous phase to the bottom of the agitated slurry at the rate of 8.5 grams per minute. After agitating the mix for 24 hours while maintaining the temperature between 120°–130° F., the slurry is neutralized to a pH of 6.5 and the starch product filtered, washed substantially free of salt, and dried. The product on being cooked with heat in a neutral 10% solids concentration suspension to granule dispersion will form a translucent, cohesive paste which will not gel on cooling and will retain its fluidity on standing.

While in the foregoing specification, we have set out the steps of the process in detail for the purpose of illustrating one embodiment of the invention, it will be understood that such details may be varried widely by those skilled in the art without departing from the spirit of our invention.

We claim:

1. In a process of the character set forth, the steps of reacting unswollen, granule starch, under non-swelling conditions with an alkylene oxide in a water solution of a water soluble salt selected from a group consisting of the salt of an alkali metal and an alkaline earth metal, and filtering and drying the starch.

2. In a process of the character set forth, the steps of reacting unswollen, granule starch under non-swelling conditions with ethylene oxide in a water solution of a water soluble salt selected from a group consisting of the salt of an alkali metal and an alkaline earth metal, and filtering and drying the starch.

3. In a process of the character set forth, the steps of reacting unswollen, granule starch under non-swelling conditions with propylene oxide in a water solution of a water soluble salt selected from a group consisting of the salt of an alkali metal and an alkaline earth metal, and filtering and drying the starch.

4. In a process of the character set forth, the steps of reacting unswollen, granule starch under non-swelling conditions with an alkylene oxide in which the oxygen is linked to adjacent carbon hydrogen groups, in a water suspension containing a water-soluble salt selected from the group consisting of the salt of an alkali metal and an alkaline earth metal and soluble alkali yielding a hydroxyl ion concentration promoting the reaction between starch and the alkylene oxide, and filtering and drying the starch while maintaining the hydroxyl ion concentration below that at which swelling of the starch occurs.

5. In a process of the character set forth, the steps of reacting unswollen, granule starch under non-swelling conditions with an alkylene oxide in which the oxygen is linked to adjacent carbon hydrogen groups, in a water suspension containing sodium chloride, and filtering and drying the starch.

6. In a process of the character set forth, the steps of reacting unswollen, granule starch, under non-swelling conditions, with an alkylene oxide in a water solution of an alkali in a proportion of from .008 to .02 mole of alkali per $C_6H_{10}O_5$ mole of starch, filtering, and drying the starch.

7. In a process of the character set forth, the steps of reacting unswollen, granule starch, in a water suspension under non-swelling conditions with ethylene oxide and an alkali, the alkali being in the proportion of .008 to .02 mole of alkali per $C_6H_{10}O_5$ mole of starch, filtering, and drying the starch.

8. In a process of the character set forth, the steps of reacting unswollen, granule starch, in a water suspension under non-swelling conditions with propylene oxide and an alkali, the alkali being in the proportion of .008 to .02 mole of alkali per $C_6H_{10}O_5$ mole of starch, filtering, and drying the starch.

9. In a process of the character set forth, the steps of reacting unswollen, granule starch under non-swelling conditions with an alkylene oxide in which the oxygen is linked to adjacent carbon hydrogen groups, in a water suspension containing strong alkali, the alkali being in a proportion of from .008 to .02 mole of alkali per $C_6H_{10}O_5$ mole of starch, filtering, and drying the starch.

10. In a process of the character set forth, the steps of reacting unswollen, granule starch under non-swelling conditions with an alkylene oxide in a water suspension containing an amount of alkali having a strength equal to .008 to .02 mole of NaOH per $C_6H_{10}O_5$ mole of starch, filtering, and drying the starch.

11. In a process of the character set forth, the steps of reacting unswollen, granule starch under non-swelling conditions with an alkylene oxide in a water solution of alkali having a strength equal to .008 to .02 mole of NaOH per $C_6H_{10}O_5$ mole of starch in a 45% solids suspension at 130° F., filtering, and drying the starch.

CARL C. KESLER.
ERLING T. HJERMSTAD.

REFERENCES CITED

The following references are of record in the file of this patent:

UNITED STATES PATENTS

| Number | Name | Date |
|---|---|---|
| 2,116,867 | Kreimeier et al. | May 10, 1938 |